D. BARCLAY AND A. M. DUDLEY.
SHAFT BRACING.
APPLICATION FILED SEPT. 10, 1915.
1,349,358.
Patented Aug. 10, 1920.
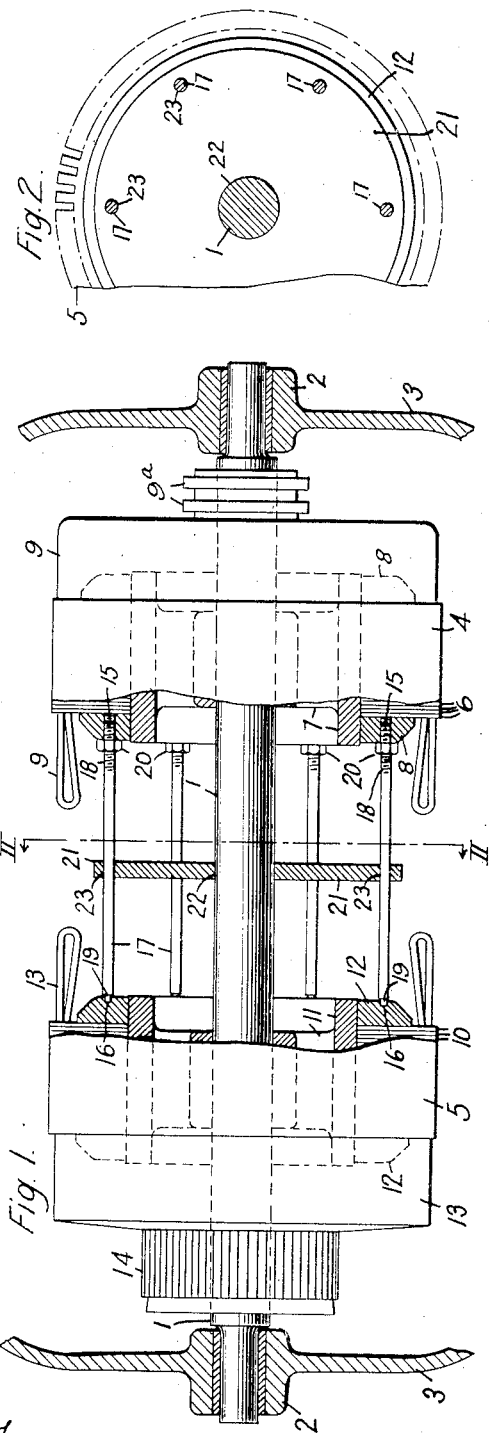
INVENTOR
David Barclay &
Adolphus M. Dudley
BY
ATTORNEY

UNITED STATES PATENT OFFICE.

DAVID BARCLAY, OF CONNEAUTVILLE, AND ADOLPHUS M. DUDLEY, OF OAKMONT, PENNSYLVANIA, ASSIGNORS TO WESTINGHOUSE ELECTRIC AND MAUFACTURING COMPANY, A CORPORATION OF PENNSYLVANIA.

SHAFT-BRACING.

1,349,358.

Specification of Letters Patent. Patented Aug. 10, 1920.

Application filed September 10, 1915. Serial No. 50,104.

*To all whom it may concern:*

Be it known that we, DAVID BARCLAY, a citizen of the United States, and a resident of Conneautville, in the county of Crawford and State of Pennsylvania, and ADOLPHUS M. DUDLEY, a citizen of the United States, and a resident of Oakmont, in the county of Allegheny and State of Pennsylvania, have invented a new and useful Improvement in Shaft-Bracings, of which the following is a specification.

Our invention relates to means for preventing vibration in the shafts of dynamo-electric machines, and it has for its object to provide means of the above-indicated character that shall be particularly adapted for use in connection with two-bearing motor-generator sets.

Motor-generator sets usually comprise two magnetizable core members mounted on a rotatable shaft in side-by-side relation intermediate the end bearings of the shaft. During the operation of such apparatus, it has sometimes been found that the unsupported portion of the shaft between the core members is deflected by the side pull produced by the magnetic conditions within the machine. Obviously, repeated deflections of the shaft will result in vibrations of increasing amplitude unless some means are provided to reinforce or stiffen the unsupported portion of the shaft.

By our invention, we provide a truss or brace between the magnetizable members, whereby the entire rotatable structure is braced against the magnetic side pull and deflections of the unsupported portion of the shaft are effectively prevented.

In the accompanying drawing, Figure is a view, in side elevation, of the rotatable shaft and magnetizable members of a motor-generator set provided with a shaft bracing constructed in accordance with our invention; Fig. 2 is a sectional view on the line II—II of Fig. 1; and Fig. 3 is a fragmentary view showing a modification of the shaft bracing.

A shaft 1 is rotatably mounted in end bearings 2 that are suitably supported by bearing brackets 3. The shaft 1 carries the magnetizable core members 4 and 5 respectively of a motor and a generator the stationary members of which are not shown. The magnetizable core member 4 of the motor comprises a plurality of laminations 6 that are assembled on a spider 7 and secured together between annular end-plates 8 in the usual manner. The member 4 is further provided with a suitable armature winding 9 that is connected to collector rings $9^a$ carried by the shaft 1. The magnetizable member 5 similarly comprises laminations 10, a spider 11 and annular end-plates 12 and is further provided with an armature winding 13 that is connected to a commutator cylinder 14. The left hand end-plate 8 of the magnetizable member 4 is provided with a plurality of equally spaced threaded openings 15 and the adjacent end-plate 12 of the magnetizable member 5 is provided with a plurality of equally spaced recesses 16 that are opposite to, and in alinement with, the openings 15 when the magnetizable members 4 and 5 are properly assembled upon the shaft 1. A plurality of rods 17 are severally provided at one end with a threaded portion 18 and at the other end with a reduced portion 19.

In assembling the rotatable structure, the magnetizable member 4 of the motor is pressed upon the shaft 1 and positioned at a predetermined distance from the end bearing 2. The rods 17 are provided with suitable nuts 20 coacting with the threaded portions 18 and are then turned into the threaded openings 15 in the end-plate 8 until the face of the end-plate engages the faces of the nuts 20. A disk 21 that is preferably circular in form is provided with a central opening 22 and a plurality of equally spaced openings 23 adjacent the outer periphery thereof. The diameter of the opening 22 is such as to form a press fit with the shaft 1, while the diameter of the openings 23 is somewhat greater than the diameter of the rods 17. The disk 21 is pressed upon the shaft 1 and positioned at a point equidistant from the ends thereof so that the rods 17 extend through the openings 23 and are free to turn therein. The mangetizable member 5 is then pressed upon the shaft 1 and is so positioned with respect to the member 4 that the central axes of the recesses 16 coincide with the axes of the rods 17. The rods 17 are of such length that when the magnetizable members 4 and 5 are properly positioned on the shaft 1 and the threaded portions 18 of the rods 17 are turned into the end plate 8, as previously described, the reduced portions 19 will be adjacent the recesses 16 but will not extend therein. The rods 17 are then turned out of the threaded openings 15 until the reduced portions 19 severally extend into and abut the bottom of the recesses 16. The rods 17 are further turned until they are all in an equal state of compression and are secured in that position by the nuts 20. The disk 21 prevents the rods 17 from buckling or becoming distorted in any way under the compression to which they are subjected.

A modification of our invention is shown in Fig. 3 in which rods 24 of substantially one-half the length of the rods 17 are severally provided with oppositely threaded portions 25$^a$ and 25$^b$ and the end-plates 8 and 12 are provided with correspondingly threaded openings 15$^a$. Turnbuckles 26 are provided to connect the rods 24 in pairs. The parts are assembled as described with reference to Fig. 1 and after the threaded portions 25$^a$ of the left-hand rods 24 have been turned into the threaded openings 15$^a$, the turnbuckles 26 are operated to place the rods 24 in a state of tension. In this modification, the rods being in tension, there is no tendency for them to buckle and the use of an intermediate disk is not necessary.

From the foregoing, it is apparent that the rods 17 and 24 coacting with the magnetizable members 4 and 5 form a composite truss which effectively prevents any deflection and consequent vibration of the unsupported portion of the shaft 1 between the members 4 and 5. By varying the amount of tension or compression to which the rods are subjected, the rigidity of the rotatable structure may be regulated in accordance with the weight of the component parts and the speed at which the apparatus is designed to operate.

While we have shown our invention in a simple and preferred form, it is not so limited but is susceptible of such modifications as may come within the scope of the appended claims.

We claim as our invention:

1. In a dynamo-electric machine, the combination with a rotatably mounted shaft, a plurality of rotors of separate and electrically independent dynomo-electric machines mounted thereon in spaced relation, of means mounted on said rotor members for bracing said shaft intermediate said rotors.

2. In a dynamo-electric machine, the combination with a rotatably mounted shaft, a plurality of rotors of separate and electrically independent dynamo-electric machines mounted thereon in spaced relation, of means for bracing said shaft intermediate said rotors comprising circumferentially spaced bracing members disposed intermediate said rotor members, and means connecting substantially the central portion of said shaft and the said bracing members.

3. In a dynamo-electric machine, the combination with a rotatably mounted shaft, a plurality of rotors of separate and electrically independent dynamo-electric machines mounted thereon in spaced relation, of means for bracing said shaft intermediate said rotors comprising circumferentially spaced bracing members disposed intermediate said rotor members, and a disk mounted on substantially the central portion of the shaft and engaging the said bracing members.

4. In a motor-generator set, a rotatably mounted shaft provided with a bearing at each end thereof, a motor rotor member and a generator rotor member mounted in spaced relation on said shaft, circumferentially spaced longitudinally extending members disposed intermediate said rotor members and making engagement therewith at points adjacent their periphery, and means for rigidly positioning the central portion of the shaft and of the said longitudinally extending members with respect to each other.

In testimony whereof I have hereunto subscribed my name this 31st day of August, 1915.

DAVID BARCLAY.

In testimony whereof I have hereunto subscribed my name this 25th day of Aug., 1915.

ADOLPHUS M. DUDLEY.